United States Patent
Lorell et al.

(10) Patent No.: US 7,009,752 B1
(45) Date of Patent: Mar. 7, 2006

(54) ACTIVELY-SUPPORTED MULTI-DEGREE OF FREEDOM STEERABLE MIRROR APPARATUS AND METHOD

(75) Inventors: Kenneth Roy Lorell, Los Altos, CA (US); Jean-Noël Aubrun, Mountain View, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 4 days.

(21) Appl. No.: 10/763,021

(22) Filed: Jan. 21, 2004

Related U.S. Application Data

(60) Provisional application No. 60/441,854, filed on Jan. 21, 2003.

(51) Int. Cl.
*G02B 26/00* (2006.01)

(52) U.S. Cl. ............... 359/290; 359/291; 359/292; 359/198; 359/203

(58) Field of Classification Search ............ 359/290, 359/221, 223, 224, 291, 198, 203, 212, 214, 359/226, 292, 871–874, 876
See application file for complete search history.

(56) References Cited

U.S. PATENT DOCUMENTS

| | | | | |
|---|---|---|---|---|
| 5,477,304 A | * | 12/1995 | Nishi | 355/53 |
| 6,327,065 B1 | * | 12/2001 | Danial et al. | 359/198 |
| 6,612,192 B1 | * | 9/2003 | Hardy et al. | 74/96 |

* cited by examiner

*Primary Examiner*—Ricky L. Mack
*Assistant Examiner*—Brandi Thomas
(74) *Attorney, Agent, or Firm*—McDermott Will & Emery LLP

(57) ABSTRACT

A steerable mirror assembly, the assembly comprising a mounting plate and a mirror with a mounting surface and a reflective surface. The assembly further comprising at least one flexible connector coupled between the mounting plate and a peripheral portion of the mirror. The flexible connector is adapted to allow the mirror to move within a predetermined range along an axis perpendicular to the surface of the mirror and adapted to allow tilting of the mirror. The assembly also comprising at least one moveable support member coupled between the mounting plate and the mounting surface of the mirror. The moveable support member provides mechanical support to the mirror and is adapted to move the mirror within a predetermined range along an axis perpendicular to the surface of the mirror and adapted to allow tilting of the mirror. The assembly additionally comprising at least one position sensor.

16 Claims, 13 Drawing Sheets

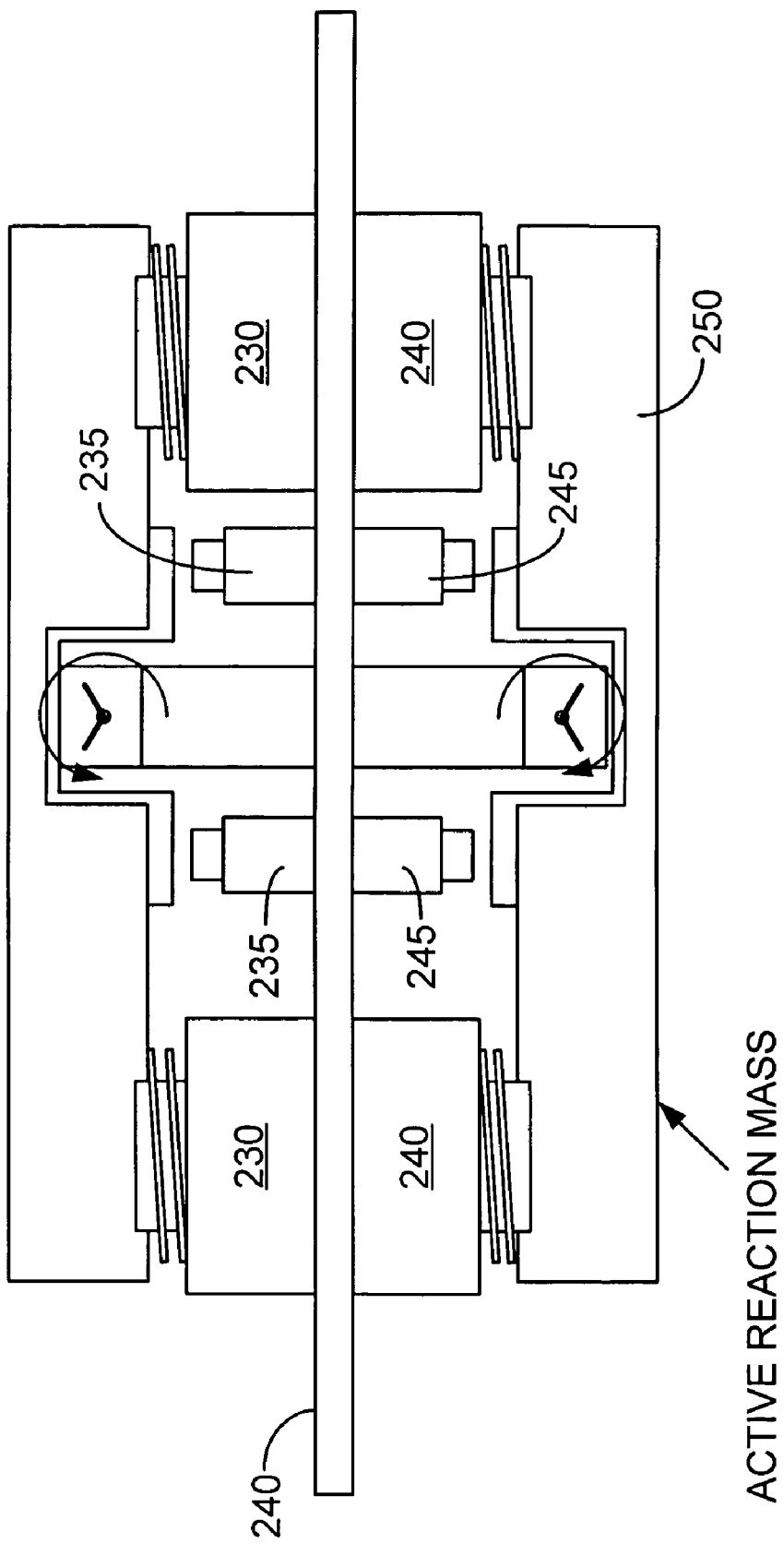

ACTIVELY-SUPPORTED MULTI-DEGREE OF FREEDOM STEERABLE MIRROR APPARATUS AND METHOD

CROSS-REFERENCES TO RELATED APPLICATIONS

This non-provisional application claims priority to U.S. provisional application No. 60/441,854 filed Jan. 21, 2003. This provisional patent application is incorporated by reference herein for all purposes.

BACKGROUND OF THE INVENTION

This present invention relates generally to optical techniques. More particularly, the invention provides a method and structure for fabricating and controlling a steerable mirror. Merely by way of example, the invention has been applied to a steerable mirror featuring a reflective surface in the shape of an annulus as can be found in telescopes commonly referred to as Cassegrain telescopes. The method and structure can be applied to other applications as well such as air or space borne telescopes, laser systems, laser radar systems, and the like.

Conventional steerable mirrors have been used in a wide variety of applications. Certain applications include spatial chopping secondary mirrors on infrared telescopes, beam stabilization for laser communications and imaging, including motion compensation, and beam steering for directed energy systems. In these applications, angular steering ranges and rates can range between one to thirty (1–30) milliradians at tens to several hundred hertz.

FIG. 1 is a simplified schematic diagram of a conventional steerable mirror. A mirror 110 is mounted on a two-axis flexure 115, which in turn, is mounted on a support base 120. A plurality of force actuators 112, such as Lorenz force actuators, mounted in between the support base and the bottom (non-reflective) side of the mirror, enable the operator to adjust the tilt angle of the mirror in both the x-z and the y-z plane. Tilting in the x-z and y-z planes is sometimes referred to as a rotation of $\theta_y$ degrees around the y-axis and a rotation of $\theta_x$ degrees around the x-axis, respectively. In the conventional steering mirror illustrated in FIG. 1, inductive position sensors 125 are mounted on the support base and used to monitor the position of the mirror. There are many drawbacks in the conventional steering mirror illustrated in FIG. 1. The mirror surface is limited in a range of motion, which is undesirable. The limited range of angular motion is typically limited to +/–10 or 20 mrad, precluding the mirror from being used in applications that require larger ranges of motion. Moreover, the range of motion is limited in the direction perpendicular to the support base. Additionally, the flexure and the mirror in FIG. 1 are coupled so that the center of rotation is aligned with the center of mass. The hole bored in the lower surface of the mirror to provide for this flexure mounting location weakens the mirror substrate. Weakening of the mirror substrate may result in undesirable deformations of the mirror surface, adversely impacting optical and structural performance. Therefore, there is a need in the art for an improved steerable mirror system.

These and other objects and features of the present invention and the manner of obtaining them will become apparent to those skilled in the art, and the invention itself will be best understood by reference to the following detailed description read in conjunction with the accompanying drawings.

BRIEF SUMMARY OF THE INVENTION

According to the present invention, optical techniques are provided. More particularly, the invention provides a method and structure for fabricating and controlling a steerable mirror. Merely by way of example, the invention has been applied to a steerable mirror with a reflective surface in the shape of an annulus such as can be found in Cassegrain telescopes. The method and structure can be applied to directed optical beam technology other applications as well such as, for example, air or space borne telescopes, laser systems, laser radar systems, and the like.

An embodiment according to the present invention provides a steerable mirror assembly. The assembly includes a mounting plate and a mirror with a mounting surface and a reflective surface. The assembly also includes at least one flexible connector coupled between the mounting plate and a peripheral portion of the mirror, wherein the flexible connector is adapted to allow the mirror to move within a predetermined range along an axis perpendicular to the surface of the mirror and adapted to allow tilting around axes parallel to a plane of the mirror. The assembly further includes at least one moveable support member coupled between the mounting plate and the mounting surface of the mirror. The moveable support member provides mechanical support to the mirror and is adapted to move the mirror within a predetermined range along an axis perpendicular to the surface of the mirror and adapted to allow tilting around axes parallel to a plane of the mirror. The assembly also includes at least one position sensor.

According to a specific embodiment, the steerable mirror assembly includes a mirror support structure, wherein the mirror is mounted on the mirror support structure. In another embodiment, the steerable mirror assembly includes at least one reaction mass mounted below a second surface of the mounting plate. In yet another embodiment, the flexible connector is a C-flexure. In another specific embodiment, the flexible connector is a U-flexure.

Another embodiment according to the present invention provides a steerable mirror assembly. The assembly includes a mounting plate, a mirror support structure, and a mirror mounted in the mirror support structure. The assembly also includes at least one flexible member coupled between the mounting plate and a peripheral portion of the mirror support structure. The assembly further includes at least one controllably moveable support member mounted between the mounting plate and the mirror support structure and located at a radial location between the outer edge of the mirror support structure and a centerpoint of the mirror. The assembly also includes at least one position sensor.

Another specific embodiment according to the present invention provides a steerable mirror. The steerable mirror includes a mirror, a mirror support structure configured to receive the mirror, and a mounting plate. The steerable mirror also includes a plurality of flexible members connecting the mirror support structure to the mounting plate, a plurality of actuators connecting the mirror support structure to the mounting plate, and a plurality of position sensors configured to monitor a position of the mirror support structure.

A method of operating a steerable mirror is provided by embodiments according to the present invention. The method includes measuring position data from at least one position sensor. The method also includes transforming the position data from a sensor coordinate space to a Cartesian coordinate space to create control data. The method further includes generating tilt and piston commands and calculating tilt and piston control laws using the tilt and piston commands and the control data. The method also includes transforming the control laws from a Cartesian coordinate space to an actuator space to create actuator data, and generating signals to actuate moveable members.

In a specific embodiment according to the present invention, the method also includes performing calculations to modify the position data after the step of measuring position data. In this specific embodiment, the method further includes performing calculations to modify the actuator data after the step of transforming the control laws from a Cartesian coordinate space to an actuator space. In yet another embodiment according to the present invention, the step of generating signals includes generating a plurality of simultaneous signals.

Applications of steerable mirrors according to embodiments of the present invention include optical terrestrial astronomical telescopes. Additionally, space-based interferometers are another potential application area. Moreover, not only optical systems that receive optical input, like telescopes, but systems that are employed in the generation and delivery of optical radiation will benefit from steerable mirrors in accordance with the present invention. For example, directed energy weapons, air-borne laser platforms, space-based laser platforms, LIDAR, and LADAR (laser radar) systems could use steerable mirrors in accordance with the present invention. As will be evident to those skilled in the art, use of steering mirrors in accordance with the present invention is not limited to the several applications discussed above.

Numerous benefits are achieved using the present invention over conventional techniques. For example, in an embodiment according to the present invention, the center of mass of the mirror is aligned with the center of rotation. This benefit is present even when the mirror has a reflective surface in the shape of an annulus. In alternative embodiments, the center of mass is located at a position between the bottom of the mirror and the mirror's reflective surface. Additionally, steerable mirrors according to embodiments of the present invention provide both a large angular range of motion and dynamic range along with high precision. Moreover, steerable mirrors according to embodiments of the present invention provide for motion of the mirror in multiple degrees of freedom. This flexibility in available mirror motions provides a system that incorporates both active piston or focus control, enabling the mirror to move in a manner analogous to rotation about the front surface of the mirror. Also, embodiments according to the present invention are useful in interferometric applications which conserve optical path lengths for given portions of the optical system. Depending upon the embodiment, one or more of these benefits may exist. These and other benefits have been described throughout the present specification and more particularly below.

Various additional objects, features and advantages of the present invention can be more fully appreciated with reference to the detailed description and accompanying drawings that follow.

BRIEF DESCRIPTION OF THE DRAWINGS

FIG. 2B is a simplified schematic diagram of a conventional steerable mirror mounted in combination with an active reaction cancellation mass.

DETAILED DESCRIPTION OF THE INVENTION

According to the present invention, optical assemblies are provided. More particularly, the invention provides a method and structure for fabricating and controlling a steerable mirror. Merely by way of example, the invention has been applied to a steerable mirror featuring a reflective surface in the shape of an annulus as can be found in telescopes commonly referred to as Cassegrain telescopes. The method and structure can be applied to other applications as well such as air or space borne telescopes, laser systems, laser radar systems, and the like.

Figure 2A:
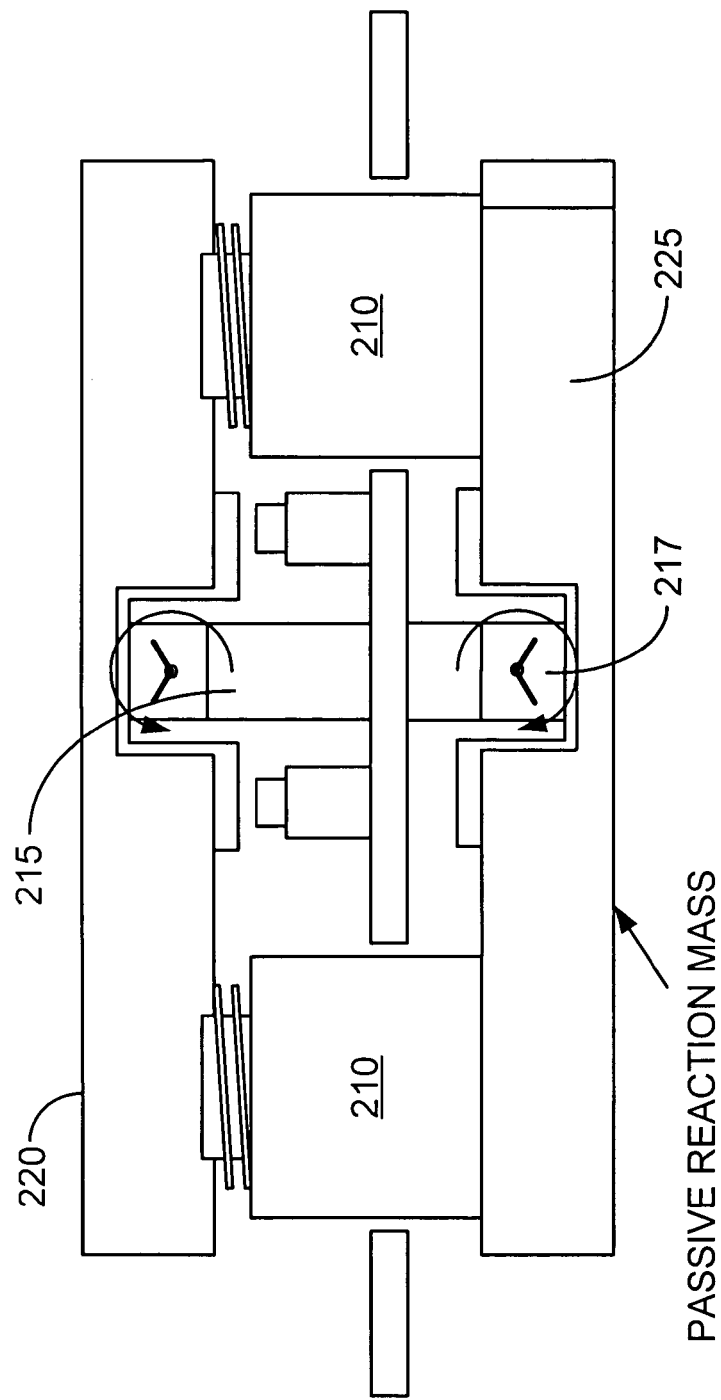
FIG. 2A is a simplified schematic diagram of a conventional steerable mirror mounted in combination with a passive reaction cancellation mass.

FIG. 2A is a simplified schematic diagram of a conventional steerable mirror mounted in combination with a passive reaction cancellation mass. Often, in precision optical systems, forces produced by the actuators 210, employed to move the mirror 220, will produce reaction forces that may excite unwanted structural vibrations. A passive reaction cancellation system as illustrated in FIG. 2A provides an equal and opposite passive reaction mass 225 coupled to actuators 210 and flexures 215 and 217. The motion of the reaction mass is coordinated with the motion of the steerable mirror assembly. Accordingly, the reaction mass moves in opposition to the steerable mirror assembly, thereby canceling reaction forces and torques. Thus, excitation of unwanted structural vibration modes is reduced.

FIG. 2B is a simplified schematic diagram of a conventional steerable mirror mounted in combination with an active reaction cancellation mass. In contrast to a passive reaction mass, the active reaction mass is translated using actuators 240 and feedback signals related to such motion are generated using sensors 245. To control the mirror surface, actuators 230 are driven to translate the mirror surface, tilting the mirror surface in the $\theta_x$ and $\theta_y$ directions. Mirror position is measured in this figure using position sensors 235.

As illustrated in FIG. 2B, the active reaction mass is connected to the mounting plate 247 through actuators 240. Position sensors 245 are mounted on the bottom surface of mounting plate 247 and configured to interact with the active reaction mass 250. Feedback signals generated by the sensors 245 may be used to generate control signals for use in driving the actuators 240. Through the use of the actuators and sensors associated with the active reaction mass, the motion of the reaction mass can actively counteract reactive forces and torques caused by the motion of the mirror.

Figure 1:
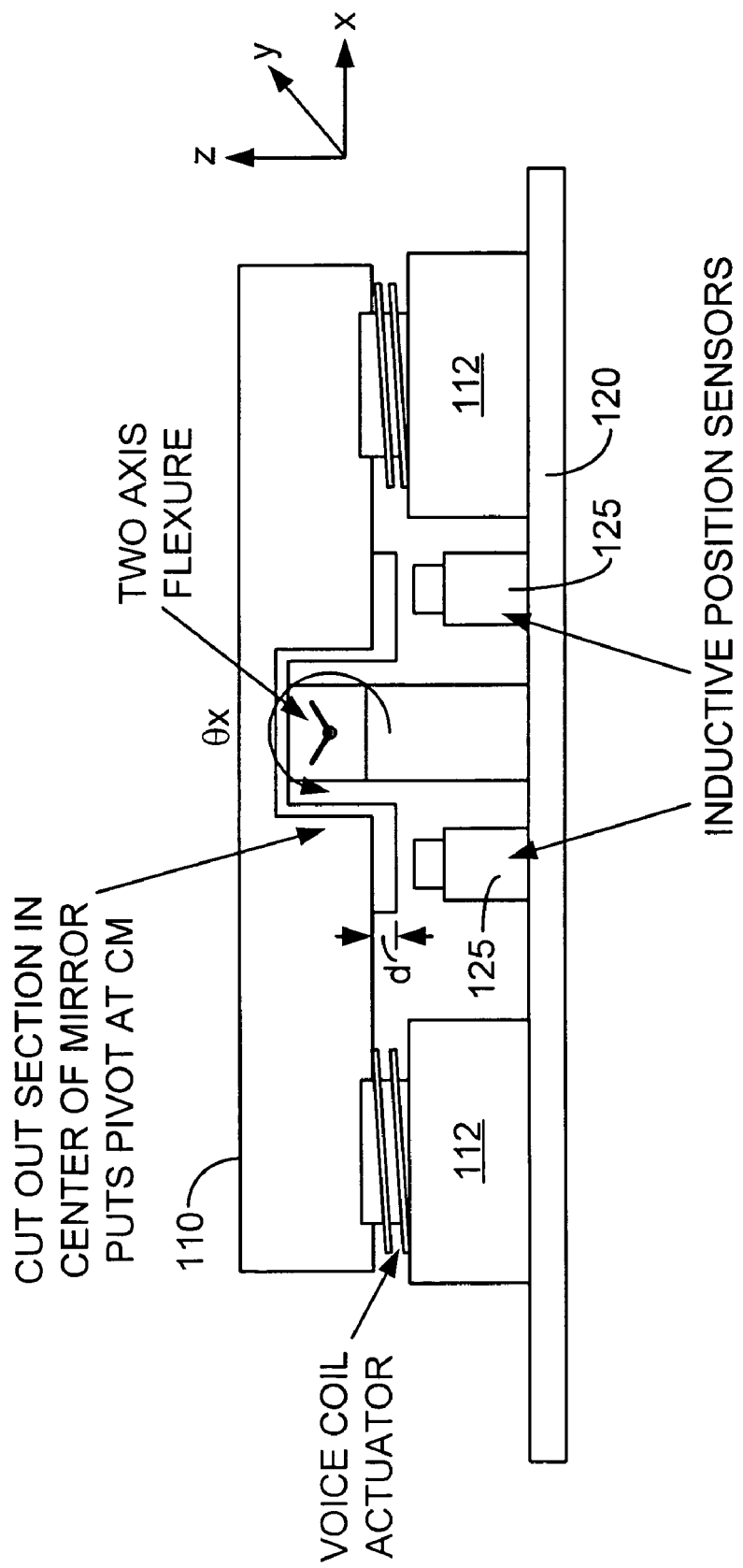
FIG. 1 is a simplified schematic diagram of a conventional steerable mirror.

In some optical systems, a mirror with a reflective surface in the shape of an annulus is employed as an optical element. For example, telescopes of the classical Cassegrain design utilize a primary mirror with a central aperture. Thus, the primary mirror features a reflective surface in the shape of an annulus. Using more than one annular-shaped mirror can overcome some of the drawbacks present in conventional optical designs. For instance, a drawback found in some reflective infrared telescope designs is that the focal plane of the telescope is exposed to blackbody radiation emitted by the secondary mirror. One approach to reduce this radiometric noise is to employ a modified-Cassegrain telescope in which, in addition to the primary mirror, the secondary mirror is fabricated in an annular shape. In this design, the aperture present in the secondary mirror is formed to be the optical equivalent of the hole in the primary mirror. Thus, the radiometric noise emitted by the secondary mirror is reduced through the use of this design. Moreover, in some optical systems, such as three-mirror anastigmats (TMA), it is desirable for the light to pass through the center of at least one mirror. In yet additional optical systems, it may be desirable to rotate a mirror with a reflective surface featuring an annular shape about the front surface of the mirror. Often, these optical systems attempt to maintain the optical path length within a predetermined range. These applications require steerable mirror characteristics not available with the mirror designs illustrated in FIGS. 1 and 2.

Figure 3:
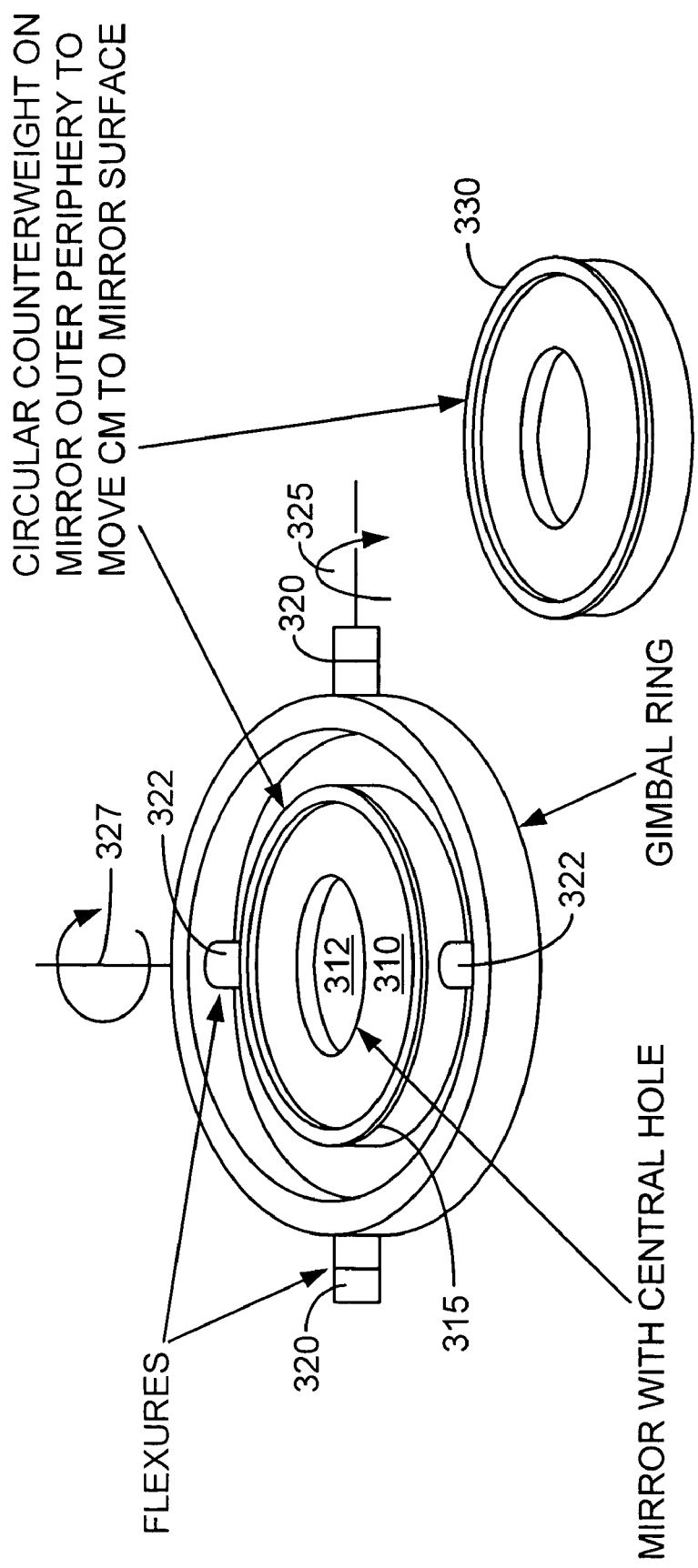
FIG. 3 is a simplified schematic diagram of a conventional gimbal-mounted steerable mirror with a counterweight ring.

FIG. 3 is simplified schematic diagram of a conventional gimbal-mounted steerable mirror. A mirror of this design meets some of the requirements desired for modified-Cassegrain telescopes and systems using TMA optics. A mirror 310 with a central aperture 312 is mounted in a mirror support structure 315. The mirror support structure, in turn, is attached to gimbals 320 and 322 that provide for rotation about the x-axis 325 and the y-axis 327, respectively.

In FIG. 3, a circular counterweight 330 has been formed above the front surface of the mirror in order to move the center of mass of the mirror assembly to the front surface of the mirror. Thus, the center of mass is aligned with the center of rotation, reducing the torque required to steer the mirror when it is rotated around the front surface. Despite the advantages provided by the gimbal-mounted design of FIG. 3, this design is hampered by the complexity, weight, and size of the gimbal system, as well as the cost.

Figure 4A:
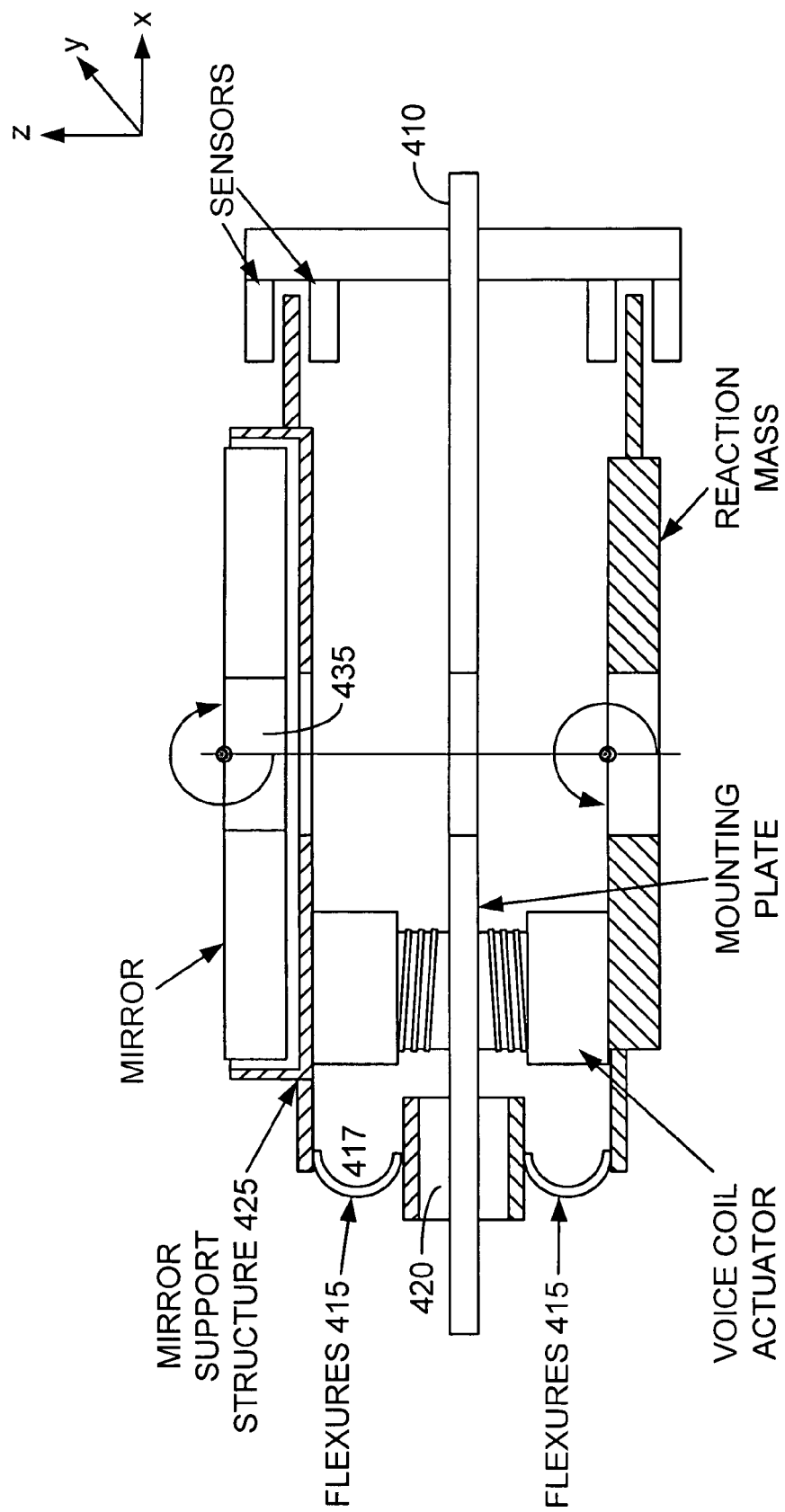
FIG. 4A is a simplified schematic illustration of a side view of a steerable mirror assembly according to an embodiment of the present invention.

FIG. 4A is a simplified schematic illustration of a side view of a steerable mirror assembly according to an embodiment of the present invention. Mounting plate 410 provides a rigid base for the mirror assembly. The rigid base can be made of any suitable material. The suitable material generally has mechanical stability and an ability to be machined accurately. The material also has to be compatible with other materials used herein, and be compatible in a working environment. As merely an example, the material can be homogeneous, layered, or any combination of these. Preferably, the material is selected from the group comprised of aluminum, steel, silicon carbide, beryllium, a composite of graphite-epoxy, and a metal matrix composite. Other materials can also be used. Preferably, the mounting plate possesses sufficiently rigidity so that resonances of the rigid base do not adversely impact the control system used to control the mirror assembly.

At least one flexible connector 415 is coupled to the mounting plate using contact mount 420. The contact mount 420 can be made of any suitable material, including the same material as the mounting plate. The mechanical properties of the contact mount are selected to be compatible with the mounting plate and the flexible connector. Merely by way of example, the contact mount can be homogeneous, layered, or any combination of these. Preferably, the material is selected from the group comprised of aluminum, steel, silicon carbide, beryllium, a composite of graphite-epoxy, and a metal matrix composite. Other materials can also be used.

The flexible connector constrains the position of the mirror support structure 425 in a flexible manner, enabling the mirror support structure to be controlled while still allowing for freedom of motion with three degrees of freedom, as will be described below. The flexible connector possesses a measure of mechanical flexibility in combination with a measure of mechanical rigidity. In the embodiment according to the present invention illustrated in FIG. 4A, the flexible connector is a C-flexure. The flexible connector in this embodiment is fabricated from a metal member and rolled into the shape of the letter "C" so that the height 417 of the flexible connector is a predetermined height. In a specific embodiment according to the present invention, the height of the flexible connector is approximately 2 cm. In alternative embodiments according to the present invention, the height of the flexible connector can be larger or smaller than 2 cm.

In an embodiment according to the present invention, the flexible connector is fabricated from a sheet of steel, but this is not required by the present invention. Other metallic materials, for example titanium, copper, and beryllium-copper can be used to fabricate the flexible connector. Additionally, alloy materials, such as Elgiloy®, made by Elgiloy Specialty Metals, of Elgin, Ill. can be used. In alternative embodiments according to the present invention, laminated metal sheets are used in fabricating the flexible connectors.

The top portion of the flexible connector is attached to the lower portion of mirror support structure 425. The mirror support structure is designed to provide a lightweight, yet high stiffness member to provide mechanical support to the mirror and reflective surface. Accordingly, materials possessing these characteristics, including steel, aluminum, silicon carbide, and beryllium are used in embodiments according to the present invention. Preferably, the mirror support structure is fabricated from beryllium, but this is not required by the present invention. Alternative embodiments according to the present invention utilize other materials, including composite materials.

The C-flexure used in an embodiment according to the present invention acts as a constraint on the mirror position, yet is flexible in the z-direction, enabling the mirror support structure to translate in the z-direction. In the embodiment according to the present invention illustrated in FIG. 4A, a mirror 430 is mounted in the mirror support structure. The mirror can be mounted in the support structure using a variety of mounting techniques. For example, the mirror can be mounted in the support structure using mechanical fasteners, adhesives, and flexures, or the like. Preferably, the mirror is mounted in the support structure by flexures that provide some mechanical isolation. Alternatively, the mirror can be mounted in the support structure by other techniques known to one of skill in the art. In an embodiment according to the present invention, the diameter of the mirror is approximately 20 cm. In an alternative embodiment according to the present invention, the diameter of the mirror is approximately 50 cm. Other embodiments according to the present invention utilize mirrors that are larger or smaller than the previously described embodiments. In the embodiment illustrated in FIGS. 4A to 4C, the mirror has a reflective surface in the shape of an annulus, allowing optical radiation to pass through a portion of the center of the mirror 435. In an embodiment according to the present invention, the mirror is fabricated from a glass blank and coated with a high reflectivity coating. For example, the coating may comprise a multi-layer dielectric stack characterized by high reflectivity over a given wavelength range. The glass blank may be optically flat or characterized by a spherical or aspherical curvature.

Figure 4B:
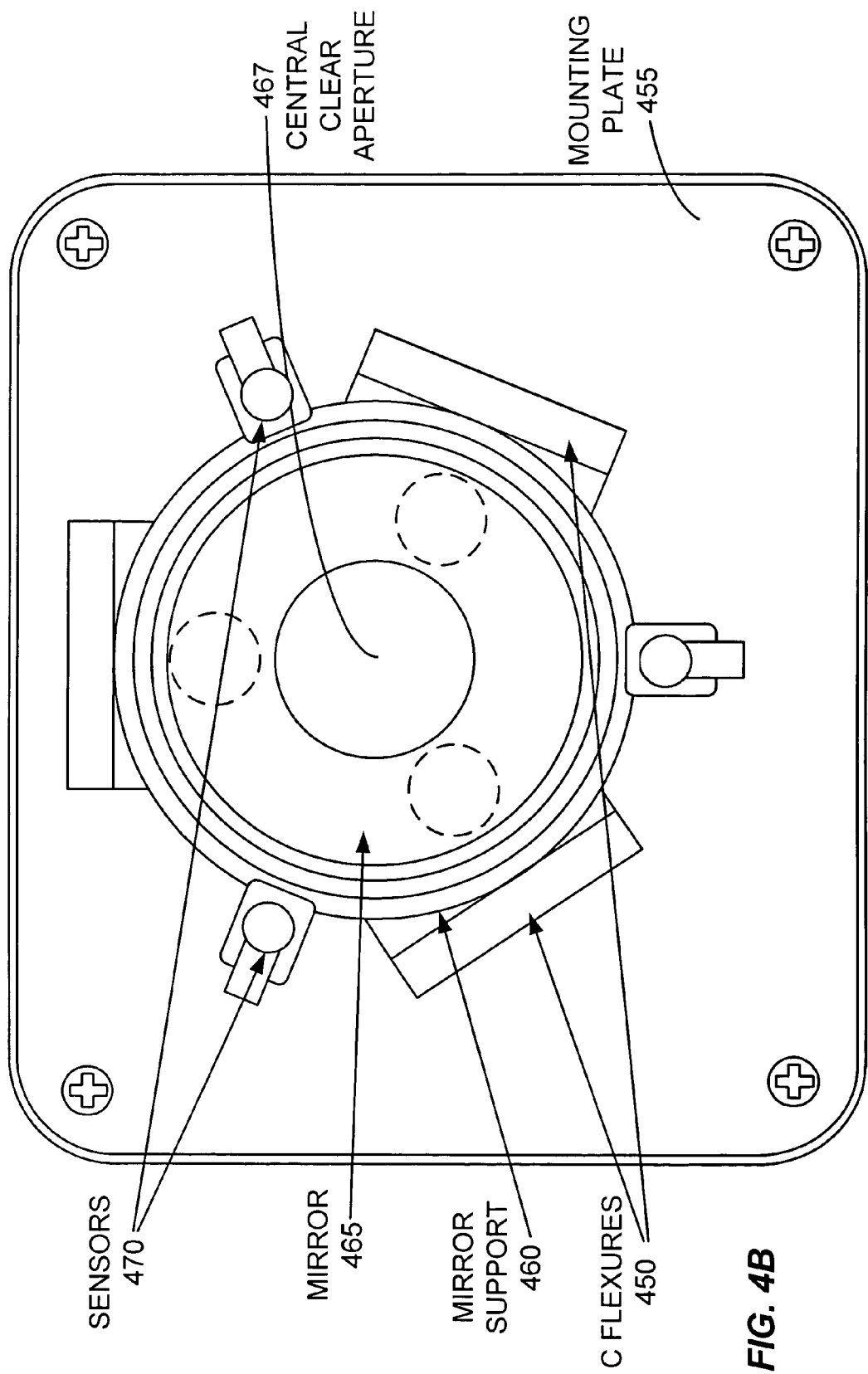
FIG. 4B is a simplified schematic illustration of a top view of a steerable mirror assembly according to an embodiment of the present invention.
Figure 4C:
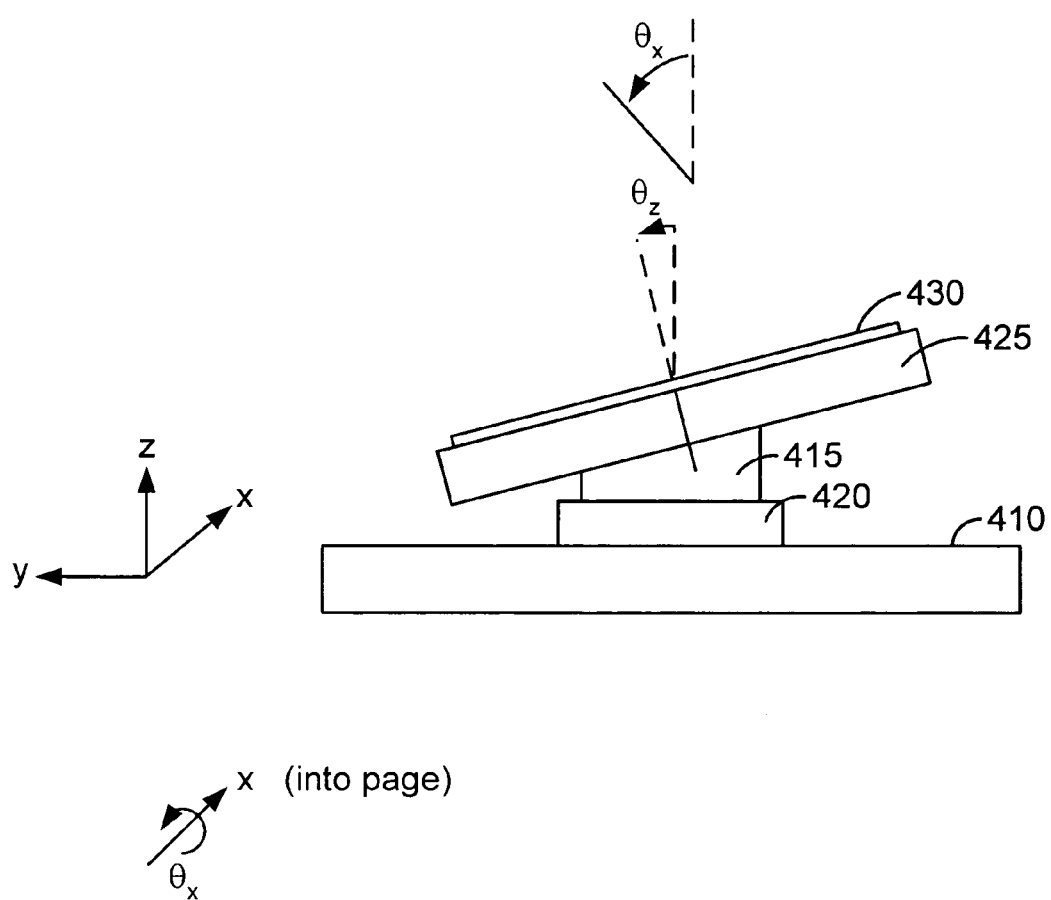
FIG. 4C is a simplified schematic illustration of an end view of a steerable mirror assembly according to an embodiment of the present invention.

The flexible connector illustrated in FIG. 4A is not only flexible in the z-direction, it is also flexible in the plane defined by the normal to the mounting plate and the back of the flexure. Thus, the axes of rotation and the z-position of the mirror surface are not defined by the flexible connectors, but by the moveable support members working in conjunction with the flexible connectors. FIG. 4C is a simplified schematic illustration of an end view of a steerable mirror assembly according to an embodiment of the present invention. Mounting plate 410, contact mount 420, flexible connector or flexure 415, mirror support structure 425, and mirror 430 are illustrated in the figure. As illustrated in FIG. 4C, the mirror has been tilted in the y-z plane, which can be represented by a rotation angle OX. For the purposes of this figure, $\theta_x$ is measured as a rotation about the x-axis with $\theta_x=0$ located in the x-y plane. The design and construction of the flexure enables the flexure to expand in a manner such that one side of the flexure may be expanded in the z-direction to a height greater than the other side. For example, in FIG. 4C, the right side of the flexure is expanded to a larger z-height than the left side of the flexure, enabling the mirror support structure and the mirror to be controllably rotated around the x-axis (in the y-z plane) to an angle $\theta_x$. In this way, the steerable mirror illustrated in FIGS. 4A–4C is not only able to translate in the z-direction, but it is also able to rotate about the x and y axes, providing three degrees of freedom.

The moveable support member 440 used in the embodiment according to the present invention illustrated in FIG. 4A is an actuator that is controllably moveable. For example, the moveable support member may be an actuator that is commonly referred to as a voice coil actuator. Alternatively, the actuator may be a Lorenz force actuator. In the embodiment according to the present invention illustrated in FIG. 4A, an actuator specifically designed and fabricated for this application is used. This current-mode actuator is provided with an input current, which generates a magnetic field in the actuator coil. A coil mounted inside the magnet is translated along the axis of the coil in response to the input current. For the actuator, control of the position of the upper surface of the support member is achievable ±10 mm. Other moveable support members may be used in alternative embodiments of the present invention. For example, electrostrictive, piezoelectric, pneumatic, hydraulic, and electromechanical screw-jack actuators are several of the potential actuators that can be used in alternative embodiments according to the present invention. Moreover, a moveable support member fabricated using a spring to provide a repulsive force, and a solenoid to provide an attractive force can be used to simplify the actuator design and achieve operating bandwidths in excess of several hundred hertz.

The distance from the support member to the center of the mirror is a design choice that is typically optimized to improve system performance. As illustrated in FIG. 4A, the distance from the support member to the flexible connector will modify the force required to tilt the mirror around the y-axis. For example, locating the support member closer to the mirror edge will decrease the torque produced at the support member. The location of the support member close to the mirror edge, rather than near the mirror center, will thus require a larger force at the support member to generate a given torque. This increase in force may possibly bend the mirror support structure. Thus, alternative embodiments according to the present invention will balance the tradeoffs between torque and force.

For example, in FIG. 4A, the distance from the support member to the center of the mirror is approximately ⅔ of the mirror radius. Thus, in the embodiment according to the present invention illustrated in FIG. 4A, the support member is positioned about ⅓ of the mirror radius from the peripheral edge of the mirror. However, this position is not required by the present invention. In alternative embodiments according to the present invention, the position of the support member is either closer to the mirror edge or closer to the mirror center as a result of different design constraints and optimization.

Embodiments according to the present invention utilize position sensors to determine the position of the mirror surface in multiple dimensions. Sensors with a large dynamic range are desirable since these sensors can provide precise position information over a large range of distances. The position sensors 445 illustrated in FIGS. 4A and 4B are interferometric sensors. For example, linear interferometric sensor model 3500-SS350C, which is commercially available from MicroE Systems of Natick, Mass. is used in an embodiment according to the present invention. The dynamic range of these linear interferometric sensors, which is approximately six order of magnitude, enables position measurements with accuracy of ±5 nm while still allowing for a travel of ±3 mm. In an alternative embodiment according to the present invention, the position sensors are inductive position sensors. For example, Kaman Aerospace sensor KD-5100 produced by the Measuring and Memory Systems division of Kaman Aerospace of Bloomfield, Conn. is used in this alternative embodiment. Alternative position sensors can also be used in yet another alternative embodiment according to the present invention.

FIG. 4B is a simplified schematic illustration of a top view of a steerable mirror assembly according to an embodiment of the present invention. The position of the flexible connectors is selected to optimize system performance. In the embodiment according to the present invention illustrated in FIG. 4B, three flexible connectors 450 are coupled to mounting plate 455 and arranged at an angular spacing of 120° from each other. Mirror support structure 460 is coupled to the flexible connectors. Mirror 465 with a reflective surface in the shape of an annulus is mounted in the mirror support structure using previously described methods. In the embodiment according to the present invention illustrated in FIG. 4B, interferometric position sensors 470 are coupled to the mounting plate and arranged opposite a matching flexible connector. In alternative embodiments, the sensors are mounted adjacent to a flexible connector. In yet another alternative embodiment, the number of flexible connectors and interferometric sensors is unequal.

In the embodiment according to the present invention illustrated in FIG. 4B, three flexible connectors are spaced at 120° increments from each other. However, this is not required. Additional flexible connectors could be added at reduced angular increments in alternative embodiments according to the present invention. In another alternative embodiment according to the present invention, the angular increments between flexible connectors, support members, and interferometric sensors is non-uniform.

As discussed in relation to FIG. 4A, the radial distance from the center of the mirror to the support members 440 will vary depending on the embodiment selected by the user. In an embodiment according to the present invention, the support members are positioned at a uniform radial distance from the mirror center. However, this is not required by the present invention. In an alternative embodiment, one or more of the support members are located at unequal radial distances with respect to the other support members.

Figure 5A:
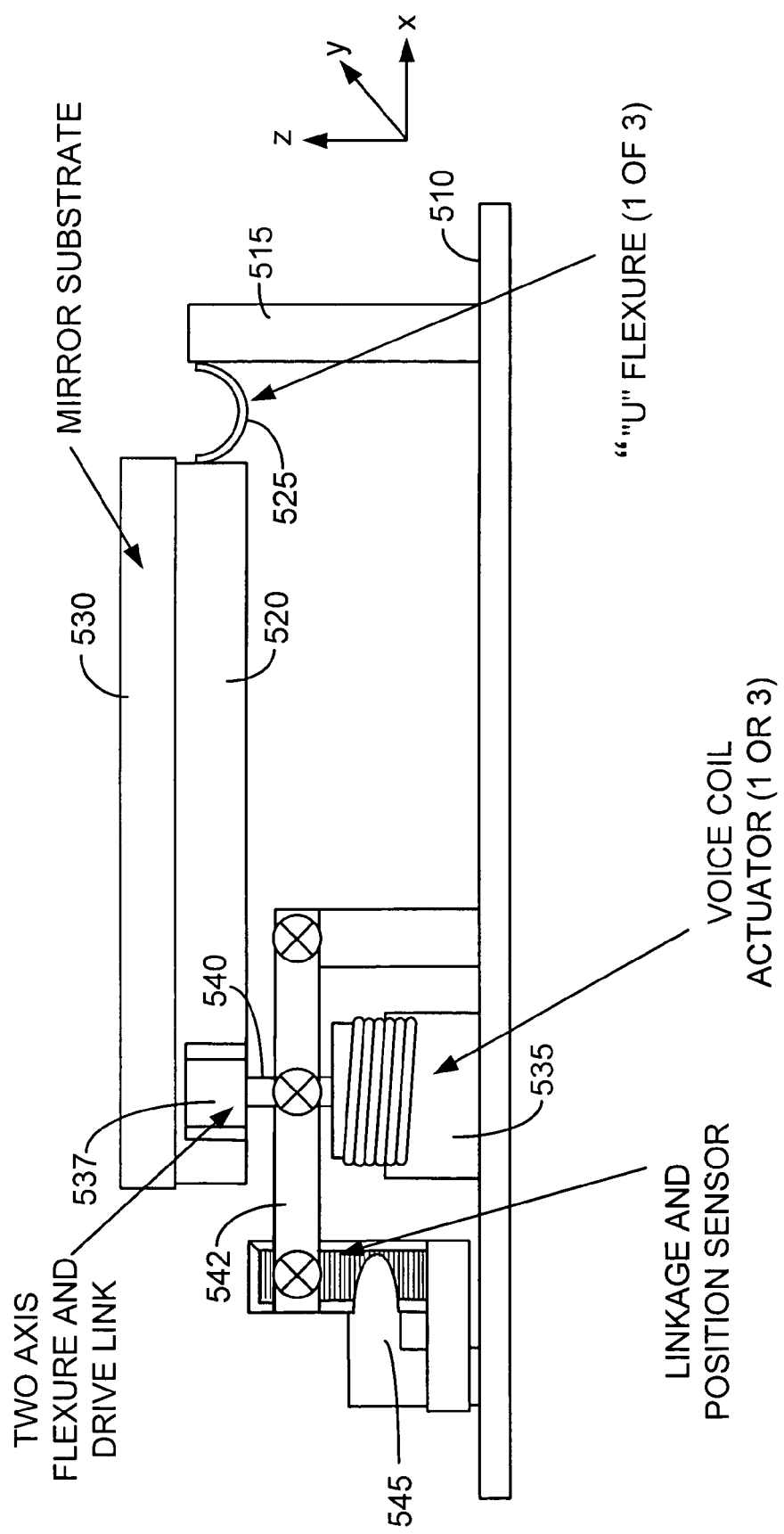
FIG. 5A is a simplified schematic illustration of a side view of a steerable mirror assembly according to an alternative embodiment of the present invention.

FIG. 5A is a simplified schematic illustration of a side view of a steerable mirror assembly according to an alternative embodiment of the present invention. In the embodiment illustrated in FIG. 5A, mounting plate 510 provides a rigid base for the mirror assembly. The rigid base can be made of any suitable material. The suitable material generally has mechanical stability and an ability to be machined accurately. The material also has to be compatible with other materials used herein, and be compatible in a working environment. As merely an example, the material can be homogeneous, layered, or any combination of these. Preferably, the material is selected from the group comprised of aluminum, steel, silicon carbide, beryllium, a composite of graphite-epoxy, and a metal matrix composite. Other materials can also be used. Preferably, the mounting plate possesses sufficiently rigidity so that resonances of the rigid base do not adversely impact the control system used to control the mirror assembly.

At least one contact mount 515 is coupled to the mounting plate and provides a region for coupling the mirror support structure 520 through a flexible connector 525. The contact mount 420 can be made of any suitable material, including the same material as the mounting plate. The mechanical properties of the contact mount are selected to be compatible with the mounting plate and the flexible connector. Merely by way of example, the contact mount can be homogeneous, layered, or any combination of these. Preferably, the material is selected from the group comprised of aluminum, steel, silicon carbide, beryllium, a composite of graphite-epoxy, and a metal matrix composite. Other materials can also be used. Mirror 530 is mounted on the mirror support structure.

In some applications of the present invention, the range of motion achievable for the mirror surface may be larger than available using the designs illustrated in FIGS. 4A–4C. For example, increased angular steering ranges or increased z-axis piston of the mirror surface may be desirable. In the embodiment according to the present invention illustrated in FIG. 5A, the flexible connector provides a larger range of z-motion than available using the C-flexure illustrated schematically in FIG. 4A. In FIG. 5A, the flexible connector is a U-flexure. The flexible connector in this embodiment is fabricated from a laminated metal member and rolled into the shape of the letter "U." Alternative embodiments according the present invention utilizes flexible connectors fabricated from other materials, as discussed in relation to the C-flexures. Examples of flexible connectors according to this embodiment are disclosed in U.S. patent application Ser. No. 10/412,565, filed on Apr. 11, 2003, assigned to the assignee of the present invention, and incorporated herein by reference in its entirety for all purposes.

FIG. 5A illustrates several modifications of the steerable mirror assembly according to an alternative embodiment of the present invention. At least one moveable support member 535 is coupled to the mirror support structure. In an embodiment according to the present invention, the moveable support member is coupled to the mirror support structure through a flexible coupling. For example, in the embodiment according to the present invention illustrated in FIG. 5A, the moveable support member is coupled to the mirror support structure through a two-axis flexible member 537 and a drive link 540. The two-axis flexible member 537 allows the mirror support structure to rotate with respect to the drive link as the moveable support member travels through its range of motion.

Additional modifications of the steerable mirror assembly according to an alternative embodiment of the present invention are also illustrated in FIG. 5A. For example, the position of a given position sensor with respect to a given moveable support member is modified from the embodiment according to the present invention illustrated in FIGS. 4A–4C. As illustrated in FIG. 5A, a position sensor 545 is located adjacent to a matching moveable support member. Linkage 542 and interferometric sensor 545 are coupled to the drive link, providing a measurement of the position of the drive link, and thus, the mirror position.

In FIG. 5A, the distance from the two-axis flexible member and the edge of the mirror is approximately ⅛ of the mirror radius. However, this position is not required by the present invention. In alternative embodiments according to the present invention, the position of the support member is either closer to the mirror edge or closer to the mirror center. As illustrated in FIG. 5A, the distance from the two-axis flexible member to the flexible connector (U-flexure in FIG. 5A) will impact the torque produced at the flexible member and modify the force required to tilt the mirror around the y-axis. For example, locating the two-axis flexible member farther from the flexible connector will increase the torque at the two-axis flexible member for a given force. Reduction in force is desirable, in some embodiments according to the present invention to reduce possible bending of the mirror support structure.

Figure 5B:
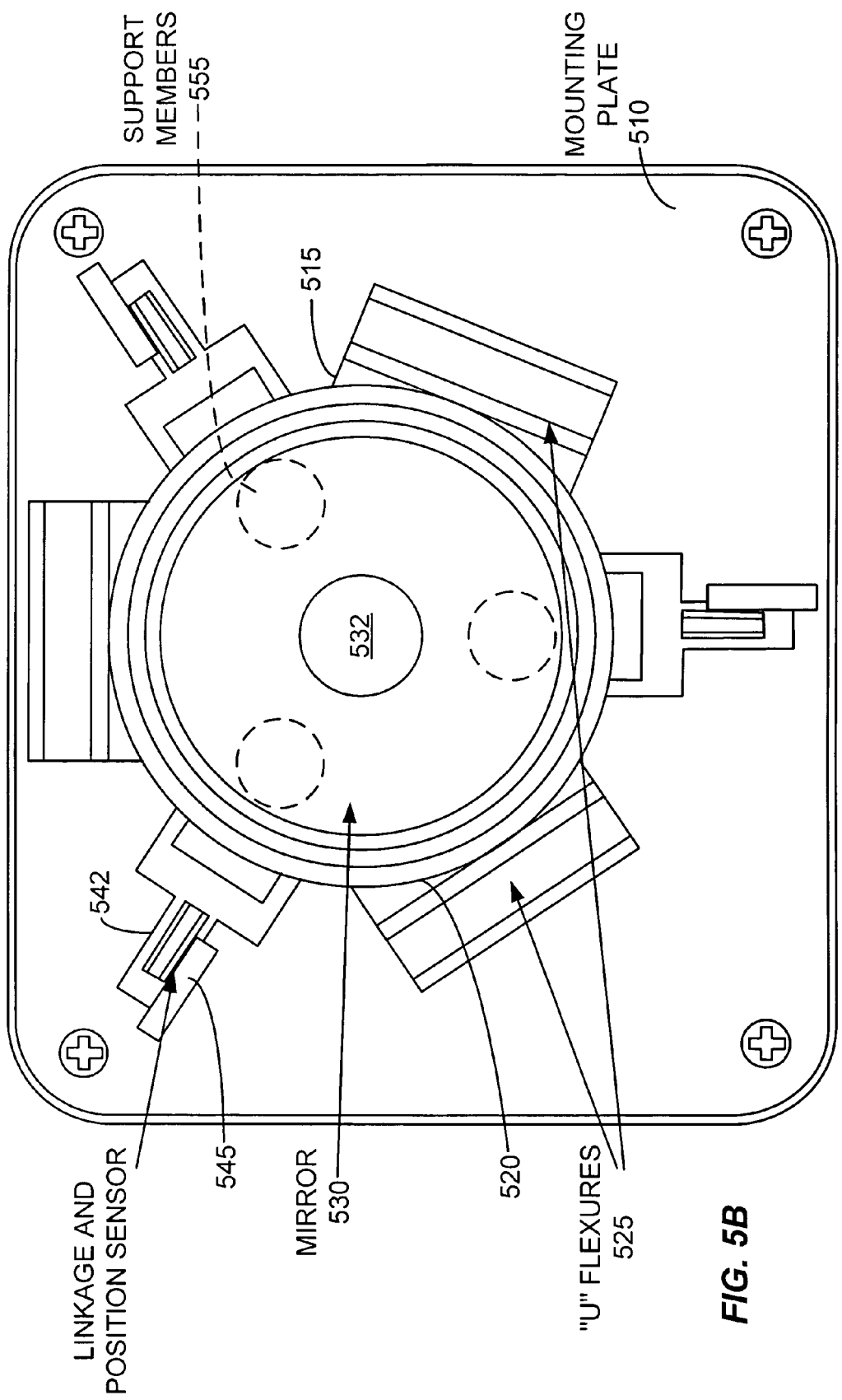
FIG. 5B is a simplified schematic illustration of a top view of a steerable mirror assembly according to an alternative embodiment of the present invention.

FIG. 5B is a simplified schematic illustration of a top view of a steerable mirror assembly according to an alternative embodiment of the present invention. In the embodiment according to the present invention illustrated in FIG. 5B, three flexible connectors 525 are coupled to mounting plate 510 using contact mounts 515 and arranged at an angular spacing of 120° from each other. Mirror support structure 520 is coupled to the flexible connectors. Mirror 530 with a reflective surface in the shape of an annulus is mounted in the mirror support structure. In the embodiment according to the present invention illustrated in FIG. 5B, interferometric sensors 545 and linkages 542 are coupled to the mounting plate and arranged adjacent to a support member, not shown, but represented by dashed circles 555. In alternative embodiments, the sensors are mounted adjacent to a flexible connector. In yet another alternative embodiment, the number of flexible connectors and interferometric sensors is unequal.

In the embodiment according to the present invention illustrated in FIG. 5B, three flexible connectors are spaced at 120° increments from each other. However, this is not required. Additional flexible connectors could be added at reduced angular increments in alternative embodiments according to the present invention. In another alternative embodiment according to the present invention, the angular increments between adjacent flexible connectors, support members, and linkages and interferometric sensors is non-uniform.

As discussed in relation to FIG. 5A, the radial distance from the edge of the mirror to the two-axis flexible member will vary depending on the embodiment selected by the user. In an embodiment according to the present invention, the two-axis flexible members are positioned at a uniform radial distance from the mirror center. However, this is not required by the present invention. In an alternative embodiment, one or more of the two-axis flexible members are located at unequal radial distances with respect to the other two-axis flexible members.

Figure 6:
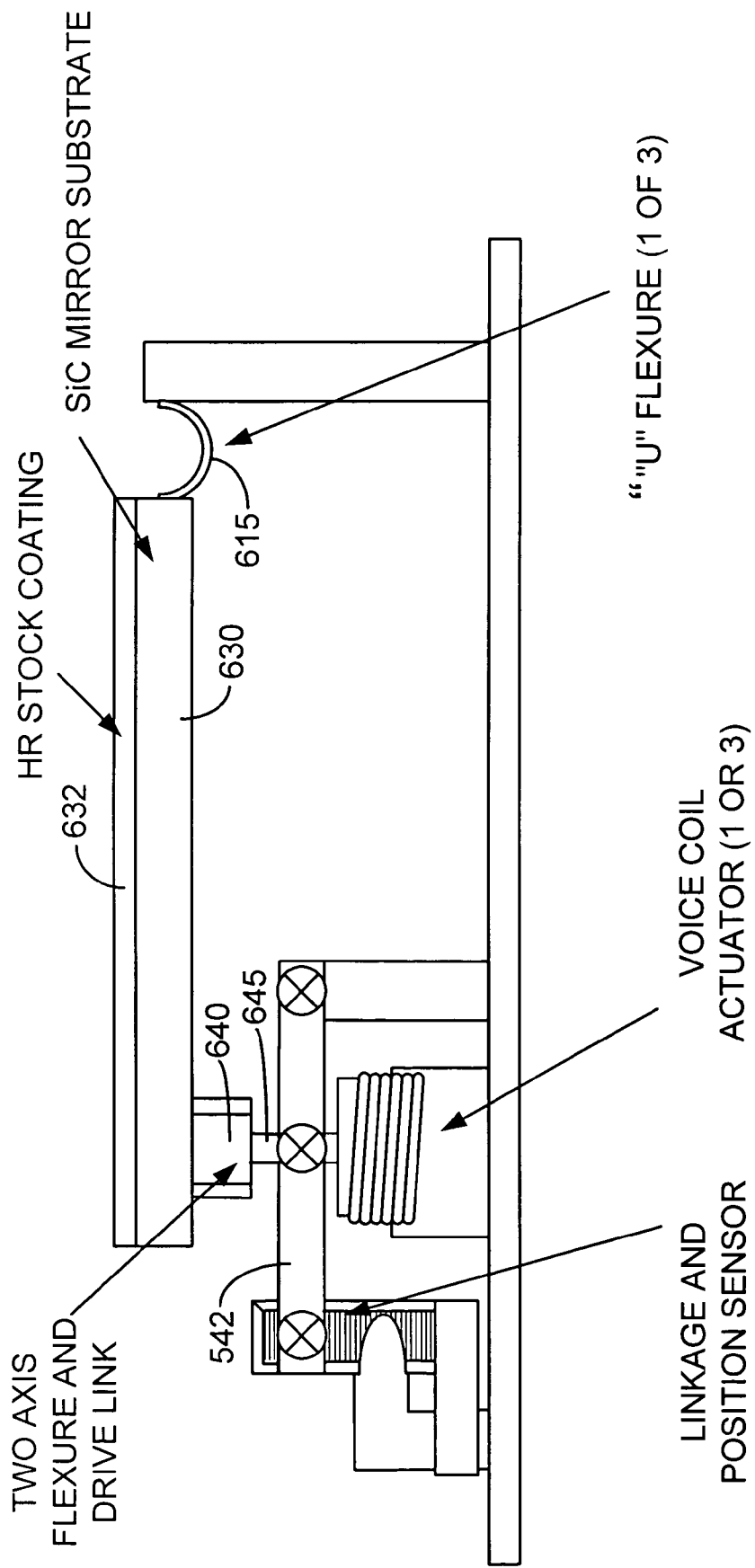
FIG. 6 is a simplified schematic illustration of a side view of a steerable mirror assembly according to another alternative embodiment of the present invention.

FIG. 6 is a simplified schematic illustration of a side view of a steerable mirror assembly according to another alternative embodiment of the present invention. In the embodiment illustrated in FIG. 6, a material with a high level of rigidity is utilized to fabricate the reflective surface. Thus, no mirror support structure is used in the embodiment according to the present invention illustrated in FIG. 6. Materials selected from the group consisting of beryllium and silicon carbide are used in embodiments according to the present invention. Preferably, a material is used that is characterized by high rigidity, can be polished to a high-quality surface finish, and can be subsequently coated with high reflectivity coatings. For example, a mirror fabricated from a SiC substrate 630 with a high reflectivity dielectric stack coating 632 is coupled to flexible connector 615, two-axis flexible member 640, and drive link 645. Alternative embodiments according to the present invention employ other dielectric stack coated metal or semiconductor substrates, including beryllium and silicon.

Figure 7:
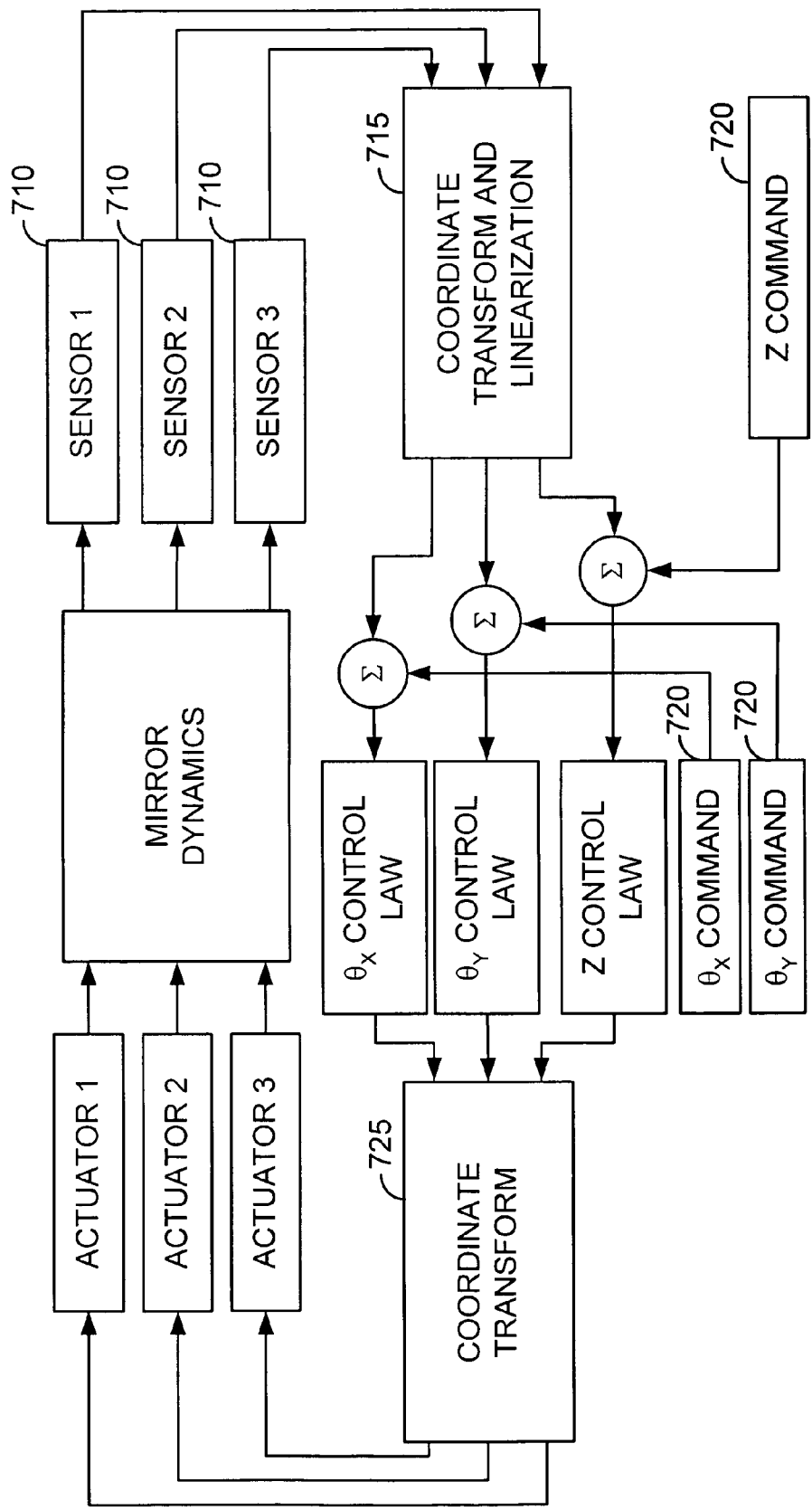
FIG. 7 is a schematic block diagram of a local control loop of an embodiment according to the present invention.

FIG. 7 is a schematic block diagram of a local control loop according to an embodiment of the present invention. FIG. 7 illustrates how, in this embodiment according to the present invention, the control system architecture utilizes a plurality of sensors and a plurality of moveable support members to control the position of the steerable mirror. The control system in this embodiment determines the mirror position in a first coordinate system, performs control calculations in a second coordinate system, and executes mirror control commands in a third coordinate system. For example, an embodiment according to the present invention performs the control calculations in Cartesian coordinates ($\theta_x$ tilt, $\theta_y$ tilt, and z piston), independent of either the number of sensors and moveable support members used in the steerable mirror assembly or the sensor/support member geometry.

In the embodiment illustrated in FIG. 7, a plurality of sensors 710 are used to obtain mirror position data. This mirror position data is referenced to a "sensor space," which is considered to be a first coordinate system. The mirror position data is linearized after collection, for example, through the use of a lookup table or a linearization equation. Alternative embodiments according to the present invention also adjust the scale factor and/or perform noise reduction calculations on the mirror position data. A benefit provided by the embodiment according to the present invention illustrated in FIG. 7 is that nonlinearities are removed and scale factor differences are accounted for inside the control loop. Subsequently, coordinate transformation 715 is used to convert the linearized position data from sensor space to Cartesian space (or control space), which is considered to be a second coordinate system.

The control system performs calculations in Cartesian space to generate the desired control laws for control of the mirror attitude, for example tilt and piston ($\theta_x$ tilt, $\theta_y$ tilt, and z piston). Calculations in Cartesian space are typically convenient since many optical error corrections commands 720 are made in tilt/tilt/piston coordinates. These three parameters, which are independent from each other, are calculated in Cartesian space according to methods well known to those skilled in the art.

Once the control laws are computed in Cartesian space, they must be transformed to "actuator space," which is considered to be a third coordinate system. Coordinate transform 725 is used to perform this transformation which converts the control commands to the coordinate system associated with the moveable support members. In the embodiment illustrated in FIG. 7, the coordinate transformation 725 can accommodate nonlinearities in the moveable support member transfer functions through either a lookup table or linearization equations after the coordinate transform is performed. In alternative embodiments according to the present invention, scale factor adjustments are performed after the coordinate transformation 725. Use of a control system in conjunction with the steerable mirror assembly described with respect to embodiments in accordance with the present invention will result in a mirror that can operate over a range of frequencies while achieving a predetermined angular range of motion as well as a predetermined translation in the z-direction. For example, embodiments according to the present invention can operate at a frequency up to approximately 1 kHz while achieving up to ±50 mrad of tilt around two axes as well as translation in the z-direction of up to several millimeters. Alternative embodiments according to the present invention will provide differing ranges of motion and operating frequencies.

Figure 8:
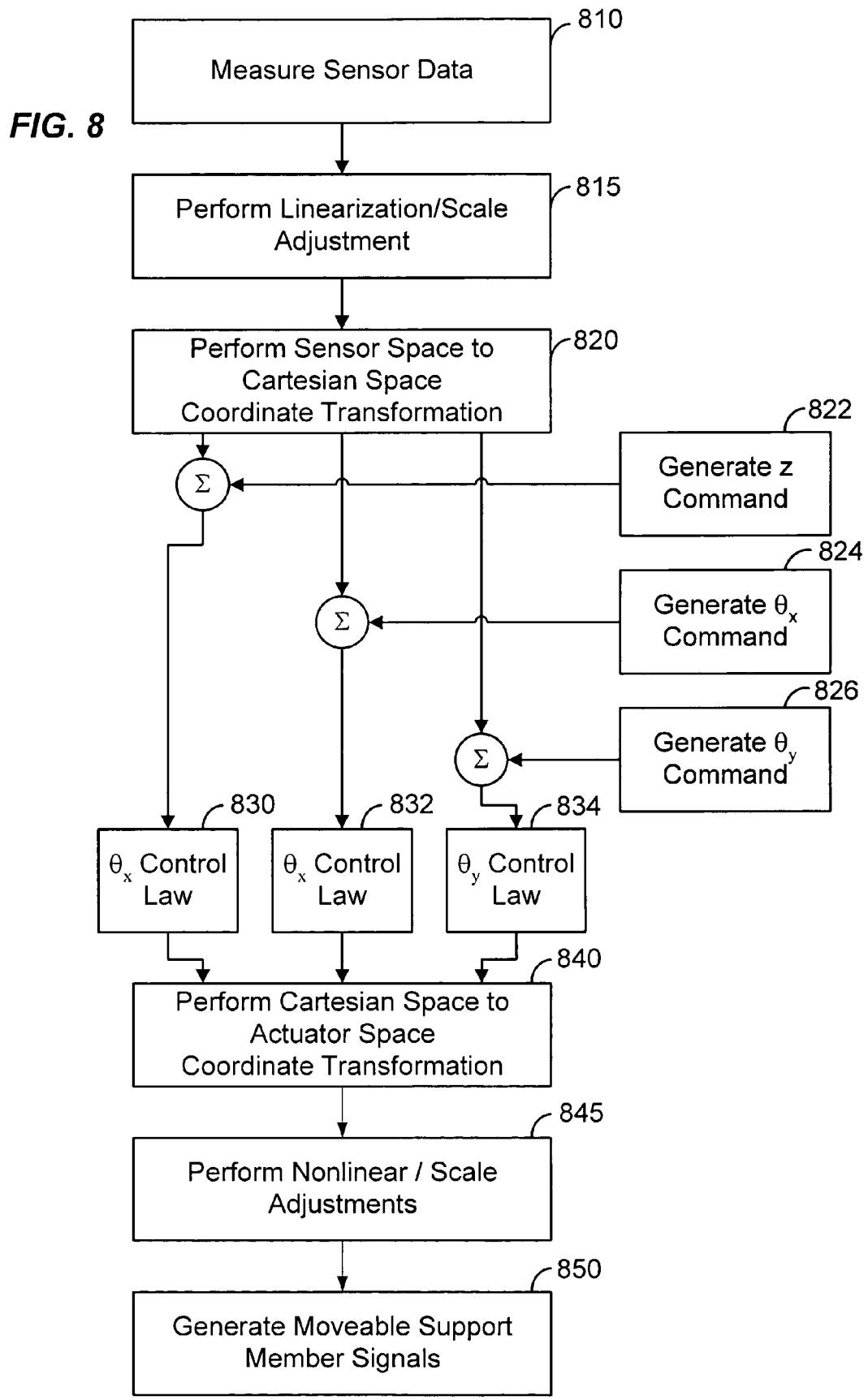
FIG. 8 is schematic flow chart illustrating the operation of a local control loop according to an embodiment of the present invention.

FIG. 8 is schematic flow chart illustrating the operation of a local control loop according to an embodiment of the present invention. The flow chart illustrates how the control system illustrated in FIG. 7 operates to exert control over the steerable mirror assembly. In step 810 sensor data is collected from the plurality of sensor elements. The sensor data is processed in step 815 to linearize the data and perform scale adjustments as necessary. In step 820, a coordinate transformation is performed to transform the data from sensor space to Cartesian or control space. In steps 822, 824, and 826, commands for the piston and tilt (z, $\theta_x$, and $\theta_y$) of the mirror assembly are generated and summed with the transformed sensor data to generate Cartesian control laws 830, 832, and 834. In step 840, the control laws are converted into actuator space through a second coordinate transformation. Nonlinearity and scale adjustments are performed on the data after transformation into actuator space (step 845) and the data is provided to the moveable support members in step 850.

Embodiments according to the present invention are useful in many interferometric applications. Typically, interferometric systems attempt to conserve optical path length as portions of the optical system, including the mirror, are adjusted. For example, in high precision Michelson interferometers, the position of the mirror located in one leg of the interferometer is controlled to maintain the mirror position within several nanoradians.

According to embodiments of the present invention, the ability to translate the mirror in the z-direction, either before, after, or during tilting of the mirror, is useful in accomplishing the goal of optical path length conservation. For example, if a steerable mirror according to an embodiment of the present invention is used in one leg of a Michelson interferometer, adjustment of the tilt angles of the mirror, as well as translation of the mirror along the leg is possible.

Phase accrual due to mirror tilt is easily compensated for by mirror translation. Additionally, embodiments according to the present invention enable the user to rotate the mirror about the front surface of the mirror, as will be described below.

Figure 9A:
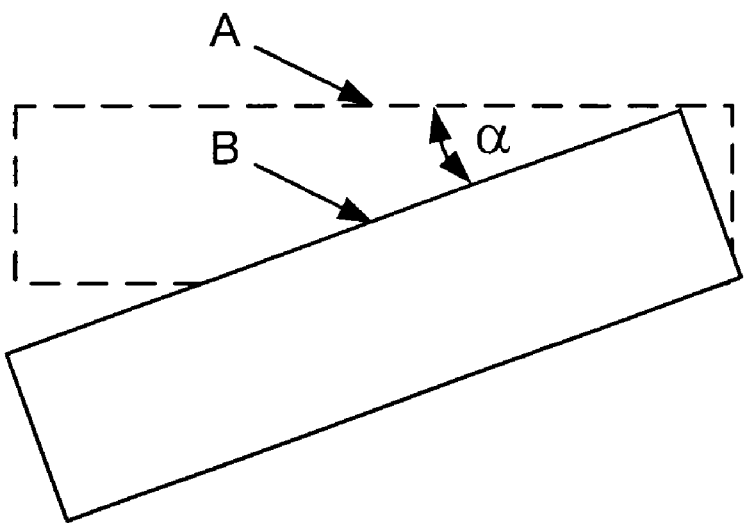
FIGS. 9A and 9B are illustrations of possible mirror positions achieved during operation of a steerable mirror assembly according to an embodiment of the present invention.
Figure 9B:
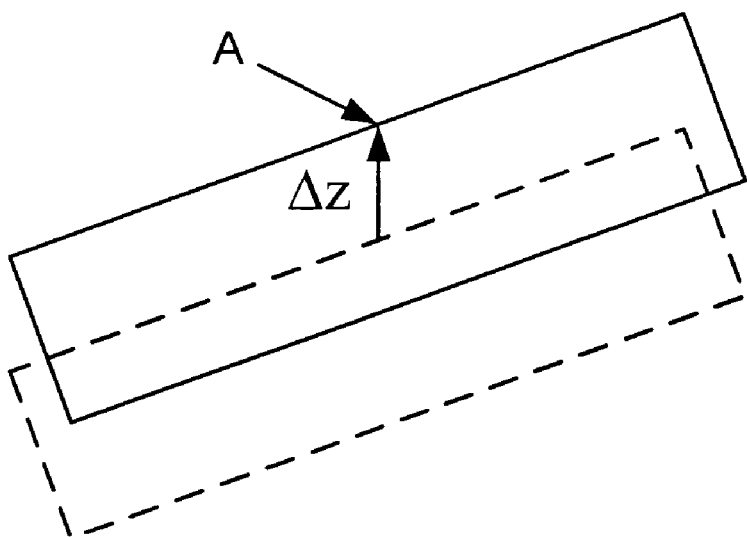

FIGS. 9A and 9B are illustrations of possible mirror positions achieved during operation of a steerable mirror assembly according to an embodiment of the present invention. In particular, FIGS. 9A and 9B illustrate how an embodiment according to the present invention performs mirror tilt adjustments while maintaining the position of the mirror surface in a desired plane. In FIG. 9A, the original position of the mirror is illustrated with dashed lines. The mirror is tilted by the control system from an angle $\theta_x=0$ to an angle $\theta_x=\alpha$ (rotated about the x-axis), resulting in a vertical shift in the position of the mirror center from point A to point B. As one skilled in the art will appreciate, this pistoning of the mirror surface in the z-direction will adversely impact system performance in interferometric applications.

FIG. 9B illustrates how, to overcome this pistoning action, the mirror is translated in the z-direction by a predetermined amount to return the position of the mirror center to the original position. In FIG. 9B, the mirror is translated in the z-direction by an amount $\Delta z$ to return the position of the mirror center to the original point A. In FIG. 9B, the position of the mirror prior to this translation is illustrated with dashed lines. Although the tilting and subsequent translation operations are presented as sequential operations in FIGS. 9A and 9B, this is not necessary. Signals generated by the control system can combine these actions into a single set of commands which would accomplish both the tilting and pistoning movements in a single combined motion. This motion can be continuous or non-continuous depending on the application.

While the above is a complete description of specific embodiments of the invention, the above description should not be taken as limiting the scope of the invention as defined by the claims.

What is claimed is:

1. A steerable mirror assembly comprising:
   a mounting plate;
   a mirror with a mounting surface and a reflective surface;
   three C-shaped or U-shaped flexible connectors coupled between the mounting plate and peripheral portions of the mirror, said flexible connectors flexibly constraining the mirror;
   three support members coupled between the mounting plate and the mounting surface, wherein said support members provide mechanical support to the mirror and simultaneously move the mirror in one translational degree of freedom along an axis perpendicular to the reflective surface of the mirror and in two rotational degrees of freedom to allow tilting around axes parallel to a plane of the reflective surface; and
   at least one position sensor.

2. The steerable mirror assembly of claim 1 further comprising a mirror support structure, wherein the mirror is mounted on the mirror support structure.

3. The steerable mirror assembly of claim 1 further comprising at least one reaction mass mounted below a second surface of the mounting plate.

4. The steerable mirror assembly of claim 3 wherein the at least one reaction mass comprises:
   at least one flexure, and
   at least one position sensor.

5. The steerable mirror assembly according to claim 1, wherein said flexible connectors are comprised of metal or plastic.

6. The steerable mirror assembly according to claim 1, wherein said flexible connectors are comprised of composite multi-layer metal structures.

7. The steerable mirror assembly according to claim 1, wherein said mirror forms a central aperture.

8. The steerable mirror assembly of claim 1 wherein said flexible connectors provide control over three degrees of freedom.

9. The steerable mirror assembly according to claim 1, wherein said mounting plate is comprised of aluminum, steel, silicon carbide, beryllium, a graphite-epoxy composite, or a metal matrix composite.

10. The steerable mirror assembly according to claim 1, wherein each of said flexible connectors is 2 centimeters tall.

11. The steerable mirror assembly according to claim 1, wherein said flexible connectors are comprised of steel, titanium copper, beryllium-copper, or ELGILOY® alloy.

12. The steerable mirror assembly according to claim 1, wherein the reflective surface is annular shaped.

13. The steerable mirror assembly according to claim 1, wherein said support members are actuators.

14. The steerable mirror assembly according to claim 13, wherein said support members are voice coil actuators.

15. The steerable mirror assembly according to claim 13, wherein said support members are Lorenz force actuators.

16. The steerable mirror assembly according to claim 1, wherein said flexible connectors are spaced at an angular spacing of 120° from each other.

* * * * *